H. Smith,
Cooking Fork.
Nº 76,835. Patented Apr. 14, 1868.
Fig. 1  Fig. 2
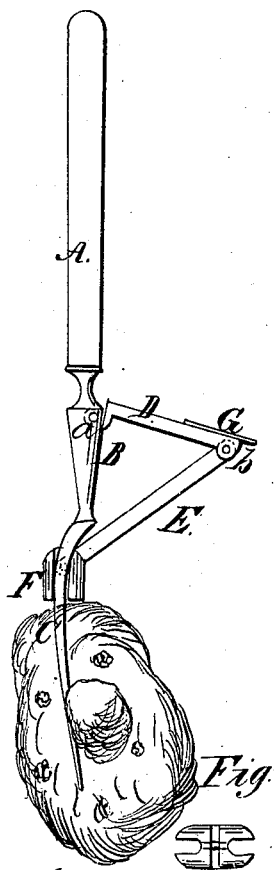
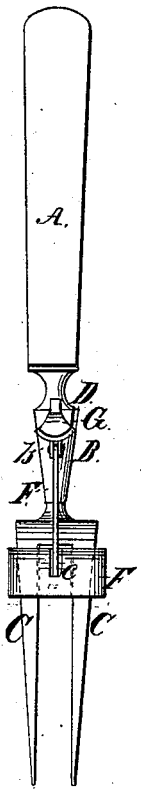
Fig. 3
Witnesses:
J. Alson Fraser
W. Trewin
Inventor:
Hiram Smith
Per Munn & Co
Attys

United States Patent Office.

HIRAM SMITH, OF DES MOINES, IOWA.

Letters Patent No. 76,835, dated April 14, 1868.

IMPROVEMENT IN COOK-FORKS.

The Schedule referred to in these Letters Patent and making part of the same.

TO ALL WHOM IT MAY CONCERN:

Be it known that I, HIRAM SMITH, of Des Moines, in the county of Polk, and State of Iowa, have invented a new and improved Cook-Fork; and I do hereby declare that the following is a full and exact description thereof, which will enable others skilled in the art to make and use the same, reference being had to the accompanying drawings, and to the letters of reference marked thereon.

This invention relates to a new and useful improvement in cook-forks, and consists in a novel attachment for the same, as hereinafter fully shown and described, whereby articles of food taken up from a dish or any culinary vessel, may be shoved off from the tines of the fork without the application of the thumb or fingers thereto, or without scraping them off at the side of a dish. In the accompanying sheet of drawings—

Figure 1 is a side view of my invention.
Figure 2, a front view of the same.
Figure 3, a detached view of a part pertaining to the same.

Similar letters of reference indicate like parts.

A represents the handle, B the shank, and C C the tines of a fork, constructed like an ordinary table or carving-fork. In the shank B of the fork, one end of an arm or bar, D, is connected by a joint, $a$. The outer end of this arm or bar D is connected by a joint, $b$, to one end of a similar bar, E, the opposite end of the latter being connected by a joint, $c$, to a slide, F, which is fitted on the tines C C, and allowed to work freely up and down thereon. On the outer end of the arm or bar D there is secured a plate, G, which serves as a thumb-piece.

From the above description it will be seen that when the tines of the fork are thrust into an article of food, the slide F will be moved upward on the tines, as shown in fig. 1, and in order to disengage the article from the tines, the thumb is pressed upon the plate G, and the slide F is moved down, shoving the article before it entirely off from the tines.

When the tines are shoved into an article of food, the arm or bar D must of course be left free to move, in order that the slide F may move upward on the tines.

Having thus described my invention, I claim as new, and desire to secure by Letters Patent—

The lever D, pivoted at $a$ to the shank B of the fork, its outer end provided with the thumb-plate G, and pivoted at $b$ to the rod E, whose lower end is attached to the slide F, between the tines C, all constructed, arranged, and operating as described, for the purpose specified.

HIRAM SMITH.

Witnesses:
JASPER WOODFORD,
WM. G. FOOTE.